US010119836B2

(12) United States Patent
Aki et al.

(10) Patent No.: US 10,119,836 B2
(45) Date of Patent: Nov. 6, 2018

(54) TACT MEASUREMENT DEVICE FOR ACTUATOR AND SENSOR SIGNAL DETECTING DEVICE

(71) Applicant: SMC CORPORATION, Chiyoda-ku (JP)

(72) Inventors: Tomohiko Aki, Nagareyama (JP); Takaaki Goto, Joso (JP); Takahiro Shinozaki, Shimotsuma (JP); Norimasa Ozaki, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 358 days.

(21) Appl. No.: 14/734,408

(22) Filed: Jun. 9, 2015

(65) Prior Publication Data
US 2016/0003640 A1    Jan. 7, 2016

(30) Foreign Application Priority Data
Jul. 7, 2014    (JP) ................. 2014-139480

(51) Int. Cl.
G01D 5/14       (2006.01)
F15B 15/28      (2006.01)
F15B 19/00      (2006.01)

(52) U.S. Cl.
CPC ........... G01D 5/14 (2013.01); F15B 15/2861 (2013.01); F15B 19/005 (2013.01); G01D 5/145 (2013.01); F15B 2211/6336 (2013.01)

(58) Field of Classification Search
CPC ........ G01D 5/14; G01D 5/145; F15B 19/005; F15B 15/2861; F15B 2211/6336
See application file for complete search history.

(56) References Cited

U.S. PATENT DOCUMENTS

| | | | | |
|---|---|---|---|---|
| 5,660,567 A | * | 8/1997 | Nierlich | A61B 5/14551 439/620.21 |
| 8,833,149 B2 | * | 9/2014 | Zhao | F02M 65/00 73/114.45 |
| 2002/0009568 A1 | * | 1/2002 | Bries | A47G 1/175 428/40.1 |

(Continued)

FOREIGN PATENT DOCUMENTS

| | | |
|---|---|---|
| JP | 2000-153432 | 6/2000 |
| JP | 2004-11722 A | 1/2004 |

(Continued)

OTHER PUBLICATIONS

Office Action dated Apr. 11, 2017 in Japanese Patent Application No. 2014-139480 (with unedited computer generated English translation).

Primary Examiner — Jermele M Hollington
Assistant Examiner — Zannatul Ferdous
(74) Attorney, Agent, or Firm — Oblon, McClelland, Maier & Neustadt, L.L.P.

(57) ABSTRACT

A detecting unit detects a first output signal and a second output signal, which are output by a first sensor and a second sensor disposed on an actuator, and outputs a first detection signal and a second detection signal to a measurement unit. Based on the first detection signal and the second detection signal, the measurement unit measures a tact time taken for a piston to move from one end to another end of a movement range.

19 Claims, 18 Drawing Sheets

(56) References Cited

U.S. PATENT DOCUMENTS

2005/0008511 A1* 1/2005 Kim .................. F04B 35/045
　　　　　　　　　　　　　　　　　　　417/416
2009/0097040 A1* 4/2009 Robert ............... G01D 5/34715
　　　　　　　　　　　　　　　　　　　356/614

FOREIGN PATENT DOCUMENTS

JP　　　2004-169887 A　　6/2004
JP　　　2005-242522　　　9/2005

* cited by examiner

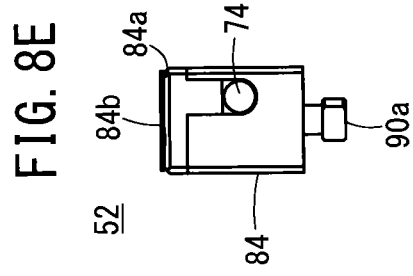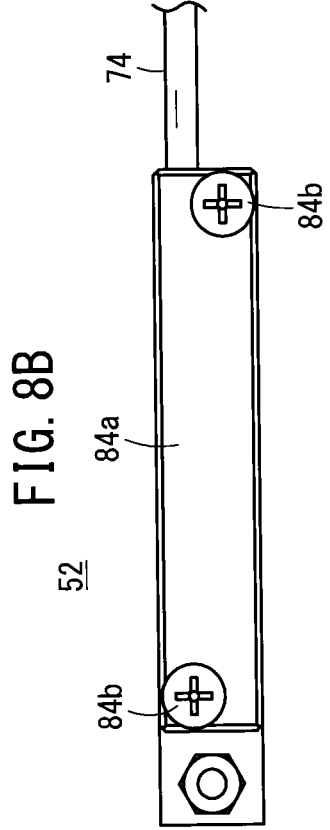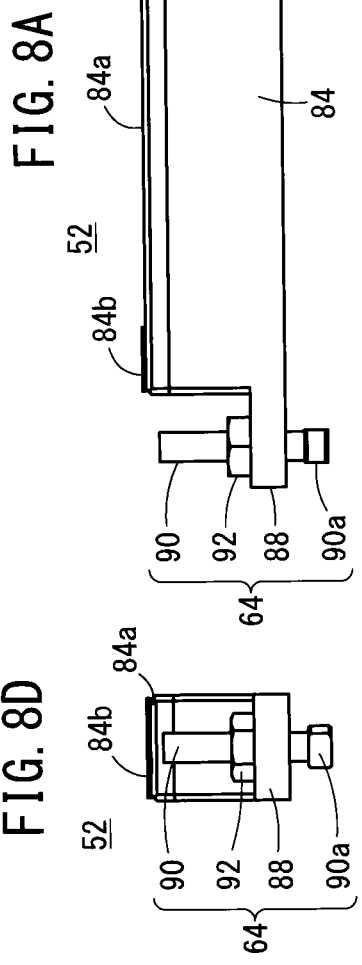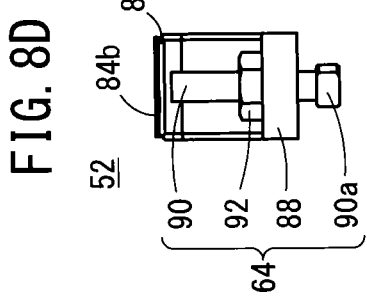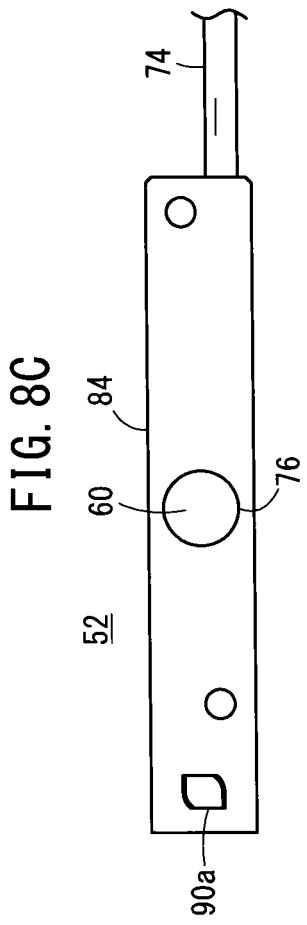

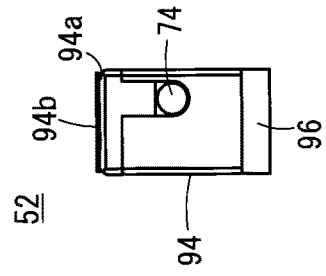
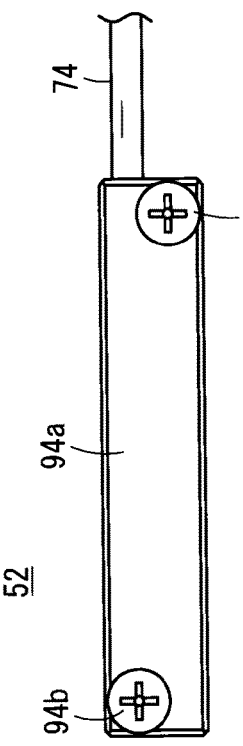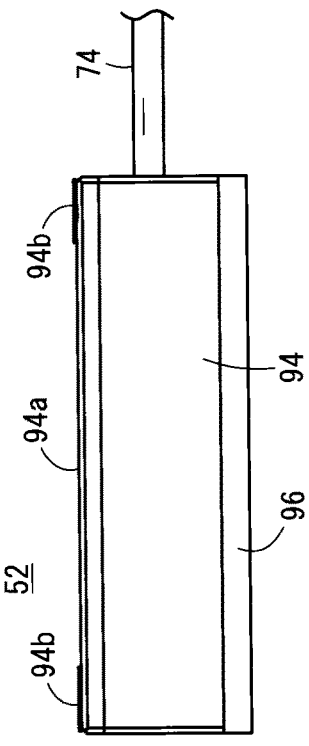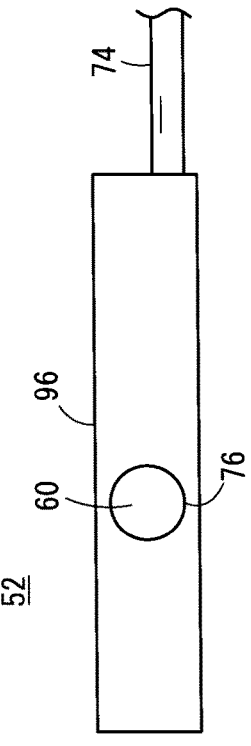
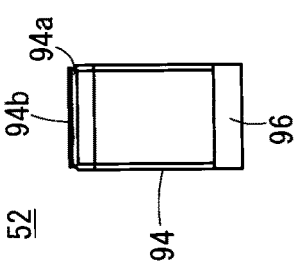

TACT MEASUREMENT DEVICE FOR ACTUATOR AND SENSOR SIGNAL DETECTING DEVICE

CROSS-REFERENCE TO RELATED APPLICATION

This application is based upon and claims the benefit of priority from Japanese Patent Application No. 2014-139480 filed on Jul. 7, 2014, the contents of which are incorporated herein by reference.

BACKGROUND OF THE INVENTION

Field of the Invention

The present invention relates to a tact measurement device for an actuator that measures a tact time taken for a movable member of the actuator to move from one end to another end of a movement range, and to a sensor signal detecting device that is used by the tact measurement device.

Description of the Related Art

In production sites, for managing the performance of actuators or the like, situations occur in which it is necessary to measure a time that it takes for a movable member of an actuator to move from one end to another end of a movement range, for example, to measure a time that it takes for a piston to move from one end to another end of a movement range inside of a cylinder. Such a stroke time (operation time) is referred to as a tact time, or simply tact.

As one measurement method for measuring tact, for example, a method is used in which a device such as a linear displacement sensor or a laser displacement meter is arranged in the vicinity of the moveable member of the actuator, and the displacement of the movable member is measured. Further, in an apparatus which is equipped with magnetic proximity sensors (auto switches) provided respectively at one end (one end of the movement range of a piston) and another end (another end of the movement range of the piston) of a cylinder, and which performs a stop position confirmation of the cylinder by using output signals of the magnetic proximity sensors, it is possible for the tact of the cylinder to be measured by outputting the output signals from the magnetic proximity sensors to a PLC (Programmable Logic Controller).

Technologies in which the aforementioned measurement methods are used are disclosed in Japanese Laid-Open Patent Publication No. 2005-242522 and Japanese Laid-Open Patent Publication No. 2000-153432. According to Japanese Laid-Open Patent Publication No. 2005-242522 and Japanese Laid-Open Patent Publication No. 2000-153432, methods are disclosed in which the position of a movable member of an actuator is detected using limit switches or proximity switches or the like, and the tact of the actuator is measured by transmitting output signals to a control apparatus such as a PLC.

SUMMARY OF THE INVENTION

If tact is measured using a device such as a linear displacement sensor or a laser displacement meter, it is necessary for sensor heads thereof to be arranged at specified positions. However, there is a concern that, in the vicinity of the actuator, adequate space cannot be secured to enable installation of the sensor heads.

Further, in the case that a signal from a pre-existing magnetic proximity sensor or the like is used, it is necessary for new programs to be added to a control unit such as a PLC for the purpose of performing the tact measurement. However, for adding these types of new programs, it is necessary to have an understanding of the system for each line. Furthermore, it is necessary to prepare programs for each programming language that is used in the PLC. Moreover, if the capacity of the storage unit for storing such programs is small, it is necessary to increase the capacity of the storage unit. Considering these aspects overall, preparations must be undertaken to facilitate the addition of programs. As a result, the load or burden imposed for carrying out the tact measurement is increased.

The present invention has been devised taking into consideration the aforementioned problems, and has the object of providing a tact measurement device for an actuator, and a sensor signal detecting device that is used by the tact measurement device, which with a simple structure, are capable of reducing the load incurred for carrying out tact measurement.

The tact measurement device for an actuator according to the present invention measures a tact time taken for a movable member of the actuator to move from one end to another end of a movement range, and includes a detecting unit and a measurement unit, which are provided separately from sensors that are disposed on the actuator.

More specifically, in the tact measurement device for an actuator according to the present invention, the detecting unit detects a first output signal that is output responsive to detecting, by a first sensor, that the movable member is positioned at the one end of the movement range, the first sensor being disposed on the actuator, and outputs a first detection signal, and further detects a second output signal that is output responsive to detecting, by a second sensor, that the movable member is positioned at the other end of the movement range, the second sensor being disposed on the actuator, and outputs a second detection signal. The measurement unit measures the tact time taken for the movable member to move from the one end to the other end of the movement range, based on the first detection signal and the second detection signal.

According to the present invention, tact can be measured merely by disposing the detecting unit with respect to a pre-existing actuator driving device having the first sensor and the second sensor that detect the position of the movable member of the actuator. Therefore, measurement of tact can easily be performed. Furthermore, in comparison with large-scale equipment, such as a linear displacement sensor or a laser displacement meter, the detecting unit is simple in structure and conserves space. Moreover, the present invention enables tact to be measured at a low cost.

Further, according to the present invention, since output signals, which are output by the pre-existing first sensor and second sensor, are detected, and tact is measured by the measurement unit that is provided separately from the control unit of the actuator, there is no need for programs for the tact measurement to be added to the control unit such as a PLC. Therefore, it is unnecessary to take preparations for adding programs (understanding the system for each line, preparing programs for each programming language used by the PLC, increasing the capacity of the storage unit for storing such programs, etc.). Accordingly, the burden imposed when tact measurement is carried out is reduced.

In the tact measurement device according to the present invention, the detecting unit may include a first detecting unit and a second detecting unit. In this case, the first detecting unit may include a first output signal detecting unit that detects the first output signal and outputs the first detection signal, and a first detection signal output unit that outputs to the measurement unit the first detection signal that was output by the first output signal detecting unit. Further, the second detecting unit may include a second output signal detecting unit that detects the second output signal and outputs the second detection signal, and a second detection signal output unit that outputs to the measurement unit the second detection signal that was output by the second output signal detecting unit. By dividing the detecting unit into the first detecting unit and the second detecting unit, the first detecting unit and the second detecting unit can be reduced in size individually. Therefore, a further savings in space can be achieved.

In the tact measurement device according to the present invention, the first detecting unit may include a first connector configured to detachably mount the first output signal detecting unit to the first sensor that is disposed on the actuator, and the second detecting unit may include a second connector configured to detachably mount the second output signal detecting unit to the second sensor that is disposed on the actuator. By detachably providing the first detecting unit and the second detecting unit, when the actuator is operated, the first detecting unit and the second detecting unit can be detached from the actuator. Therefore, it is possible to prevent the space surrounding the actuator from becoming narrowed.

In the tact measurement device according to the present invention, the first detecting unit may include a marker that indicates an attachment direction with respect to the first sensor disposed on the actuator, and the second detecting unit may include a marker that indicates an attachment direction with respect to the second sensor disposed on the actuator. By the first and second detecting units including the marks, which indicate the directions in which the first and second detecting units should be installed, the operation when the detecting units are attached can be simplified.

In the tact measurement device for an actuator according to the present invention, the first connector may include a first gripping member that grips the first sensor disposed on the actuator, and the second connector may include a second gripping member that grips the second sensor disposed on the actuator. The structures of the first and second gripping members are simple. Further, if the first and second gripping members are used, the operation to attach and position the first and second detecting units with respect to the first and second sensors disposed on the actuator can be simplified.

In the tact measurement device for an actuator according to the present invention, the first connector may include a first projection that is fitted into the first sensor disposed on the actuator, and the second connector may include a second projection that is fitted into the second sensor disposed on the actuator. The structures of the first and second projections are simple. Further, if the first and second projections are used, the operation to attach and position the first and second detecting units with respect to the first and second sensors disposed on the actuator can be simplified.

In the tact measurement device for an actuator according to the present invention, the first connector may include a first adhesive that is adhered to the first sensor disposed on the actuator, and the second connector may include a second adhesive that is adhered to the second sensor disposed on the actuator. The arrangement of the first and second adhesives is simple. Further, by using the first and second adhesives, the operation to attach the first and second detecting units with respect to the first and second sensors disposed on the actuator can be simplified.

A sensor signal detecting device according to the present invention includes an output signal detecting unit that detects a signal output by a sensor, and outputs a detection signal, a detection signal output unit that externally outputs the detection signal that was output by the output signal detecting unit, and a connector configured to detachably mount the output signal detecting unit to the sensor.

In the sensor signal detecting device according to the present invention, there may further be provided a marker that indicates an attachment direction with respect to the sensor. Further, the connector may include a gripping member that grips the sensor, the connector may include a projection that is fitted into the sensor, or the connector may include an adhesive that is adhered to the sensor.

According to the present invention, tact can be measured merely by disposing the detecting unit (the first detecting unit and the second detecting unit, i.e., the sensor signal detecting device) with respect to a pre-existing actuator driving device having the first sensor and the second sensor that detect the position of the movable member of the actuator. Therefore, measurement of tact can easily be performed. Furthermore, in comparison with large-scale equipment, such as a linear displacement sensor or a laser displacement meter, the detecting unit is simple in structure and conserves space. Moreover, the present invention enables tact to be measured at a low cost.

Further, according to the present invention, since output signals, which are output by the pre-existing first sensor and second sensor, are detected, and tact is measured by the measurement unit that is provided separately from the control unit of the actuator, there is no need for programs for the tact measurement to be added to the control unit such as a PLC. Therefore, it is unnecessary to take preparations for adding programs (understanding the system for each line, preparing programs for each programming language used by the PLC, increasing the capacity of the storage unit for storing such programs, etc.). Accordingly, the burden imposed when tact measurement is carried out is reduced.

The above and other objects, features and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIGS. 4A to 4E are detailed descriptive views of the first detecting unit shown in FIG. 1, in which FIG. 4A is a front view of the first detecting unit, FIG. 4B is a plan view of the first detecting unit, FIG. 4C is a bottom view of the first detecting unit, FIG. 4D is a left side view of the first detecting unit, and FIG. 4E is a right side view of the first detecting unit;

FIGS. 8A to 8E are detailed descriptive views of the first detecting unit shown in FIG. 7, in which FIG. 8A is a front view of the first detecting unit, FIG. 8B is a plan view of the first detecting unit, FIG. 8C is a bottom view of the first detecting unit, FIG. 8D is a left side view of the first detecting unit, and FIG. 8E is a right side view of the first detecting unit;

FIGS. 11A to 11E are detailed descriptive views of the first detecting unit shown in FIG. 10, in which FIG. 11A is a front view of the first detecting unit, FIG. 11B is a plan view of the first detecting unit, FIG. 11C is a bottom view of the first detecting unit, FIG. 11D is a left side view of the first detecting unit, and FIG. 11E is a right side view of the first detecting unit;

DESCRIPTION OF THE PREFERRED EMBODIMENTS

A description will be given in detail below with reference to the accompanying drawings of preferred embodiments of a tact measurement device for an actuator, and a sensor signal detecting device according to the present invention.

First Embodiment

Figure 1:
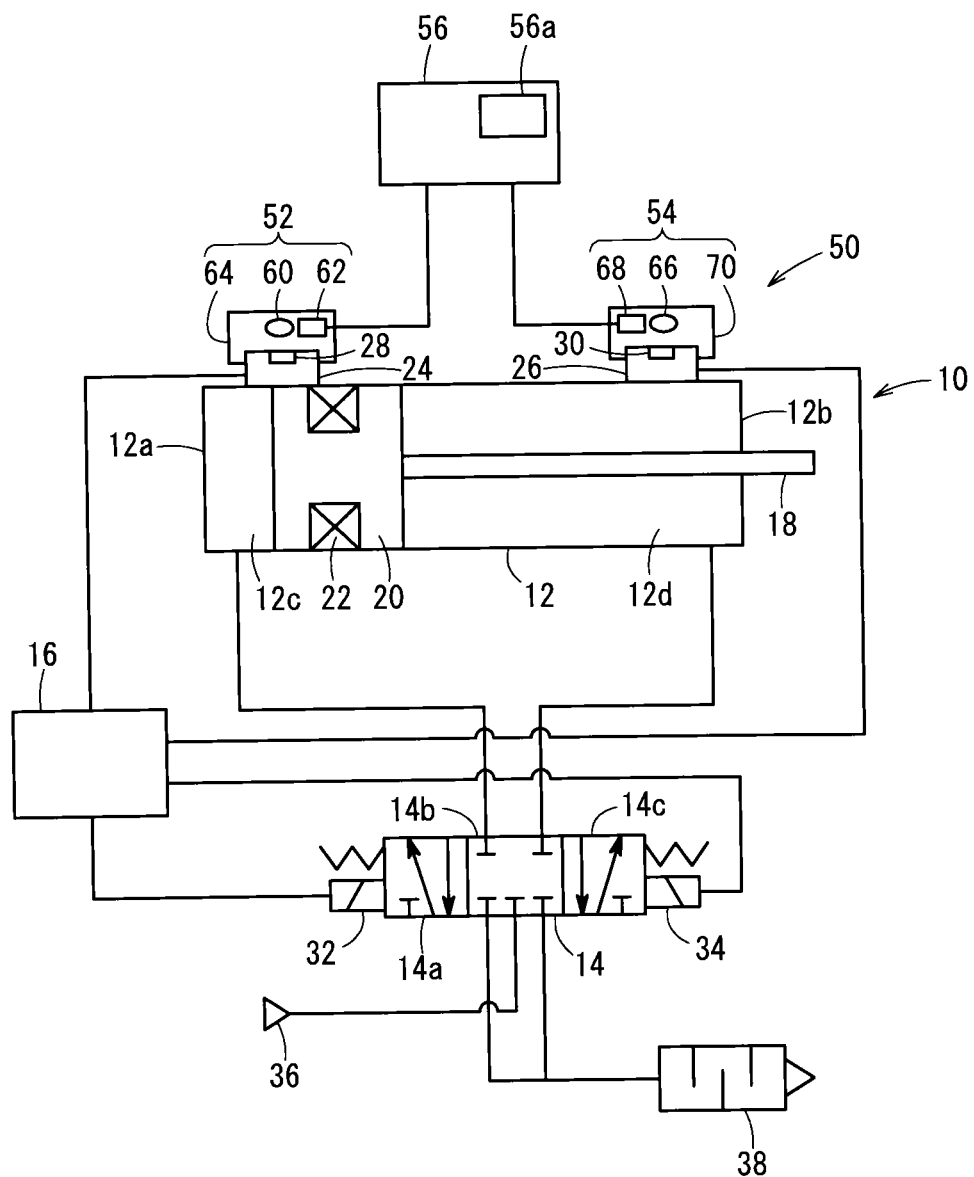
FIG. 1 is a block diagram showing a configuration in which a tact measurement device for an actuator according to a first embodiment of the present invention is disposed on an actuator driving device.

FIG. 1 is a block diagram showing a configuration in which a tact measurement device for an actuator (hereinafter also referred to simply as a tact measurement device) 50 according to a first embodiment is disposed on an actuator driving device 10.

<Configuration of Actuator Driving Device 10>

As shown in FIG. 1, the actuator driving device 10 is equipped with an actuator 12 such as a fluid pressure cylinder or the like, a directional switching valve 14 that switches the direction of a pressure fluid that is supplied to and discharged from the actuator 12, and a control unit 16 such as a PLC for controlling operations of the actuator 12 by switching the valve position of the directional switching valve 14.

A piston (movable member) 20, which is connected to a piston rod 18, is disposed in the interior of the actuator 12. The piston 20 can be slidably moved between one end 12a and another end 12b of a movement range that is defined in the interior of the actuator 12. A one-end-side pressure chamber 12c is formed by the piston 20 and an inner wall of the cylinder on the side of the one end 12a, and an other-end-side pressure chamber 12d is formed by the piston 20 and an inner wall of the cylinder on the side of the other end 12b. An annular magnet 22 is disposed on the piston 20. A first sensor 24 is disposed on the outer circumferential surface of the actuator 12 on the side of the one end 12a, and a second sensor 26 is disposed on the outer circumferential surface of the actuator 12 on the side of the other end 12b.

The first sensor 24 and the second sensor 26 comprise magnetic proximity switches (also referred to as auto switches) that detect the magnetism of the magnet 22. The first sensor 24 is equipped with a light emitting body (e.g., an LED) 28, such that when the magnet 22 is positioned inside of a magnetic detection region, the first sensor 24 detects the magnetism from the magnet 22 and transmits a signal to the control unit 16, and the first sensor 24 turns on the light emitting body 28 for thereby emitting light. Similarly, the second sensor 26 is equipped with a light emitting body 30, which is similar to the light emitting body 28, such that when the magnet 22 is positioned inside of a magnetic detection region, the second sensor 26 detects the magnetism from the magnet 22 and transmits a signal to the control unit 16, and the second sensor 26 turns on the light emitting body 30 for thereby emitting light. In the present embodiment, each of the light emitting bodies 28, 30 is made up from two light emitting bodies, more specifically, a light emitting body that emits a first light (e.g., green light), and another light emitting body that emits a second light (e.g., red light). The first sensor 24 and the second sensor 26 cause the light emitting bodies 28, 30 that emit the first light (green light) to become illuminated and emit light when the magnet 22 that is disposed on the piston 20 is positioned in the center and in the vicinity of the center of the magnetic detection regions, and cause the light emitting bodies 28, 30 that emit the second light (red light) to become illuminated and emit light when the magnet 22 is positioned away from the center and away from the vicinity of the center of the magnetic detection regions.

The directional switching valve 14 is a 4-way, 5-port, 3-position solenoid valve. Solenoids 32, 34 are disposed in the directional switching valve 14. In the case that the solenoid 32 is excited, the directional switching valve 14 switches to a valve position 14a. When the valve position 14a is switched to, pressure fluid that is supplied from a fluid pressure source 36 is supplied to the one-end-side pressure chamber 12c, and the pressure fluid that is discharged from the other-end-side pressure chamber 12d is discharged to the exterior through a silencer 38. In the case that the solenoid 34 is excited, the directional switching valve 14 switches to a valve position 14c. When the valve position 14c is switched to, pressure fluid that is supplied from the fluid pressure source 36 is supplied to the other-end-side pressure chamber 12d, and the pressure fluid that is discharged from the one-end-side pressure chamber 12c is discharged to the exterior through the silencer 38. Further, in the case that the solenoids 32, 34 are not excited, the directional switching valve 14 switches to a valve position 14b under an elastic force of an illustrated coil spring. When the valve position 14b is switched to, the one-end-side pressure chamber 12c and the other-end-side pressure chamber 12d are blocked from communication with the fluid pressure source 36 and the exterior.

The control unit 16 receives output signals that are transmitted from the first sensor 24 and the second sensor 26, and further, transmits excitation signals to the solenoids 32, 34. The output signals that are transmitted from the first sensor 24 and the second sensor 26 are used for various purposes. For example, the output signals can be used for confirming the position of the piston 20 (i.e., to confirm a compressed end position and an expanded end position).

<Configuration of Tact Measurement Device 50>

As shown in FIG. 1, the tact measurement device 50 is equipped with a first detecting unit 52 that is mounted detachably on the first sensor 24, a second detecting unit 54 that is mounted detachably on the second sensor 26, and a measurement unit 56 that monitors the detection signals from the first detecting unit 52 and the second detecting unit 54. The first detecting unit 52 and the second detecting unit 54 correspond to the sensor signal detecting device.

The first detecting unit 52 comprises a first output signal detecting unit 60 that detects a first output signal (light emission signal) output by the light emitting body 28 of the first sensor 24 that is disposed on the actuator 12, and outputs a first detection signal, a first detection signal output unit 62 that outputs to the measurement unit 56 the first detection signal that was output by the first output signal detecting unit 60, and a first connector 64 for detachably mounting the first output signal detecting unit 60 to the first sensor 24 that is disposed on the actuator 12.

Similarly, the second detecting unit 54 comprises a second output signal detecting unit 66 that detects a second output signal (light emission signal) output by the light emitting body 30 of the second sensor 26 that is disposed on the actuator 12, and outputs a second detection signal, a second detection signal output unit 68 that outputs to the measurement unit 56 the second detection signal that was output by the second output signal detecting unit 66, and a second connector 70 for detachably mounting the second output signal detecting unit 66 to the second sensor 26 that is disposed on the actuator 12.

The measurement unit 56 receives the first detection signal that is output by the first detecting unit 52 and the second detection signal that is output by the second detecting unit 54, and based on the first and second detection signals, the measurement unit 56 measures the time taken for the piston 20 of the actuator 12 to move from the one end 12a to the other end 12b of the movement range. More specifically, a time is measured from switching of the first detection signal from on to off, to switching of the second detection signal from off to on. Of course, the time taken for the piston 20 to move from the other end 12b to the one end 12a of the movement range can also be measured. The measurement unit 56 displays the measured time on a display unit 56a. Further, the measurement unit 56 is equipped with a function that can input as a parameter the movement distance of the piston 20. Using the movement distance and the measured time, an average movement velocity of the piston 20 is calculated, and is displayed on the display unit 56a.

Below, using FIGS. 2 through 5, descriptions will be given of the internal structure and the external structure of the first detecting unit 52. Since the internal structures and the external structures of the first detecting unit 52 and the second detecting unit 54 are the same, descriptions of the internal structure and the external structure of the second detecting unit 54 are omitted.

Figure 2:
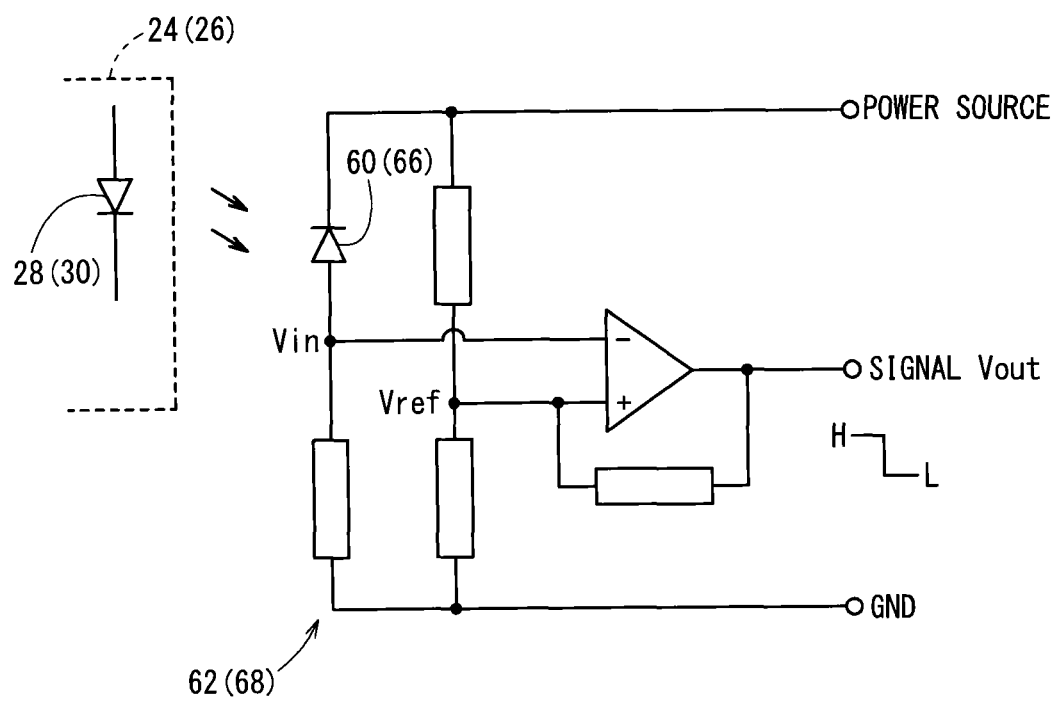
FIG. 2 is a circuit diagram showing an internal structure of a first detecting unit shown in FIG. 1.

FIG. 2 is a circuit diagram showing the internal structure of the first detecting unit 52 shown in FIG. 1, and in particular, shows the first output signal detecting unit 60 and the first detection signal output unit 62. The first output signal detecting unit 60 is equipped with a photodiode that serves as a light detector. The first detection signal output unit 62 comprises a comparator circuit that includes the first output signal detecting unit 60. When the photodiode of the first output signal detecting unit 60 detects a light emission signal that is output from the light emitting body 28 of the first sensor 24, an input voltage Vin of the comparator circuit rises, and at a point in time that the input voltage Vin exceeds a reference voltage Vref, an output voltage Vout is switched. In the case of the circuit shown in FIG. 2, when the photodiode detects the light emission signal, the output voltage Vout switches from High, i.e., off, to Low, i.e., on. The output voltage Vout is output as a detection signal to the measurement unit 56.

Figure 3:
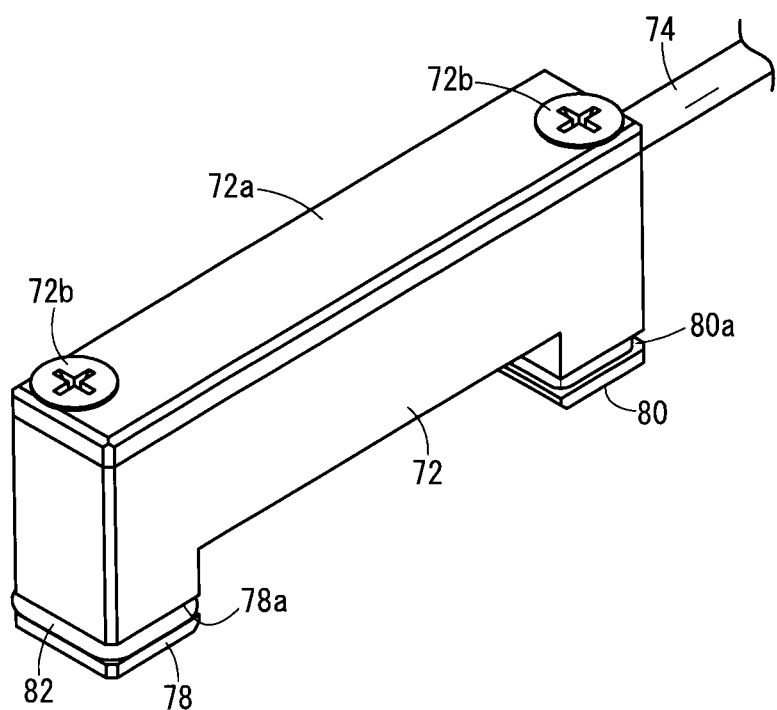
FIG. 3 is a perspective view showing an external appearance of the first detecting unit shown in FIG. 1.
Figure 4E:
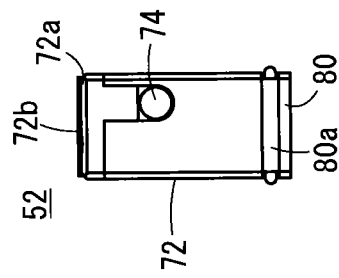
Figure 4B:
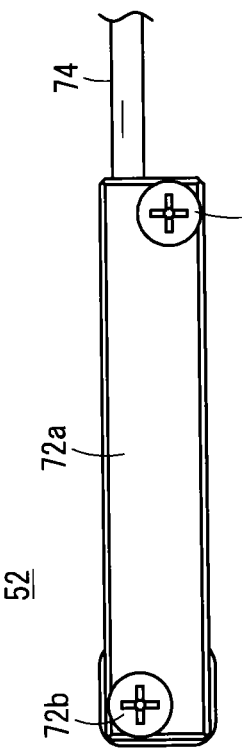
Figure 4A:
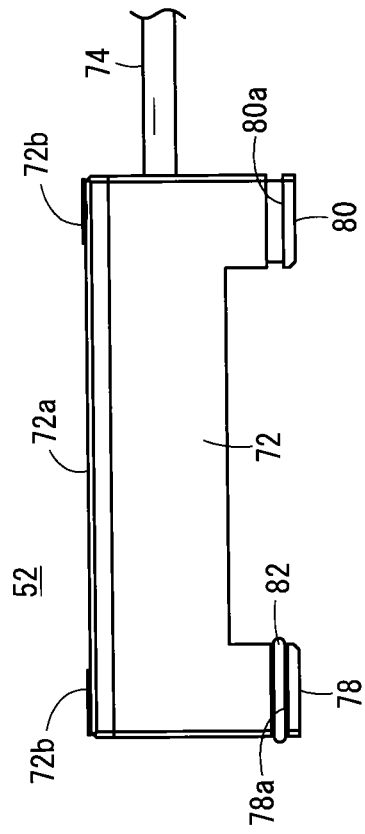
Figure 4C:
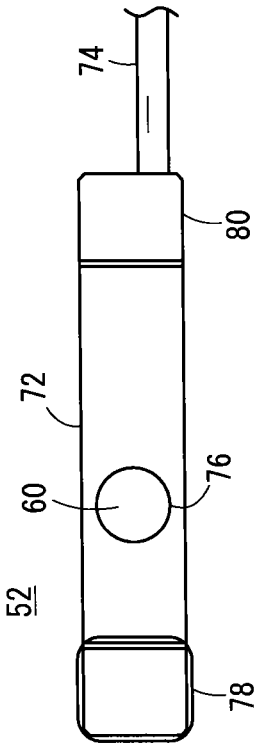
Figure 4D:
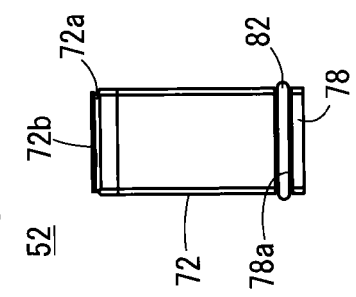
Figure 5:
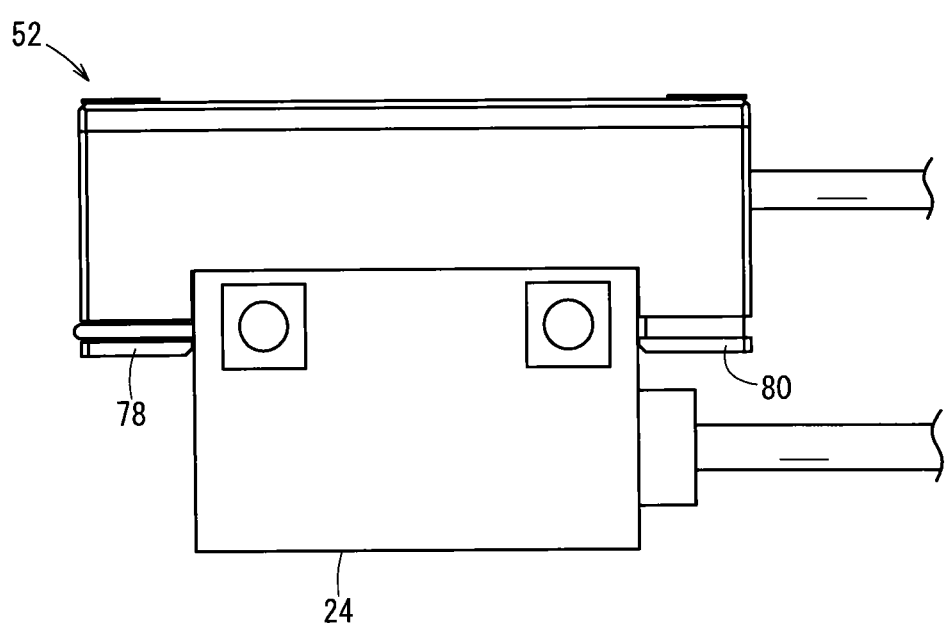
FIG. 5 is a front view showing a configuration in which the first detecting unit shown in FIGS. 4A to 4E is mounted on a first sensor that is used in the actuator driving device.

FIG. 3 is a perspective view showing the external appearance of the first detecting unit 52 shown in FIG. 1. FIGS. 4A to 4E are detailed descriptive views of the first detecting unit 52 shown in FIG. 1, in which FIG. 4A is a front view of the first detecting unit 52, FIG. 4B is a plan view of the first detecting unit 52, FIG. 4C is a bottom view of the first detecting unit 52, FIG. 4D is a left side view of the first detecting unit 52, and FIG. 4E is a right side view of the first detecting unit 52. FIG. 5 is a front view showing a configuration in which the first detecting unit 52 shown in FIGS. 4A to 4E is mounted on the first sensor 24 that is used in the actuator driving device 10. The first detecting unit 52 includes an outer casing 72 that accommodates the circuit shown in FIG. 2 in the interior thereof. On an upper portion of the outer casing 72, a lid 72a is attached thereto by screws 72b. The outer casing 72 is of a concave shape as viewed from the front and back surfaces thereof. A lead line 74, which connects the first detection signal output unit 62 and the measurement unit 56 shown in FIG. 1, is drawn out from the right side surface of the outer casing 72. On a bottom surface side of the outer casing 72, at a position confronting a light emission window of the first sensor 24, an entrance window 76 is formed into which light is taken in and made incident on the first output signal detecting unit (photodiode) 60.

Gripping members 78, 80 that correspond to the first connector 64 are formed on both side surfaces of the outer casing 72. An interval between inner sides of the gripping member 78 and the gripping member 80 is of substantially the same length as an outer shape in the longitudinal direction of the first sensor 24. Surrounding grooves 78a, 80a are formed respectively around the gripping members 78, 80. A rubber bushing 82 is installed in one of the grooves 78a. The bushing 82 is detachable with respect to the groove 78a. When the first detecting unit 52 is mounted on the first sensor 24, the bushing 82 serves to partially fill a small gap between the gripping member 78 and the first sensor 24, and also plays a role to prevent slipping. As a result, the gripping members 78, 80 can grip the first sensor 24 firmly without the gripping members 78, 80 becoming separated therefrom. By means of the first connector 64 that is formed in this manner (the gripping members 78, 80 and the bushing 82), the first detecting unit 52 can be arranged detachably with respect to the first sensor 24.

Further, the bushing 82 also carries out a role as a marker for indicating an attachment direction of the first detecting unit 52 with respect to the first sensor 24. Since by the existence of the bushing 82, the gripping member 78 and the gripping member 80 can be distinguished from each other, the attachment direction of the first detecting unit 52 with respect to the first sensor 24 can be grasped.

Further, since the interval between the inner sides of the gripping member 78 and the gripping member 80 is of substantially the same length as the outer shape in the longitudinal direction of the first sensor 24, when the first detecting unit 52 is mounted on the first sensor 24, the first detecting unit 52 can be attached easily without requiring precise positioning and alignment thereof.

<Process Flow of Tact Measurement Process>

Next, the process flow of a tact measurement process will be described with reference to FIGS. 1 and 6. In this case, an explanation will be given of measuring tact at a time when the piston 20 of the actuator 12 shown in FIG. 1 is moved from the one end 12a to the other end 12b.

Figure 6:
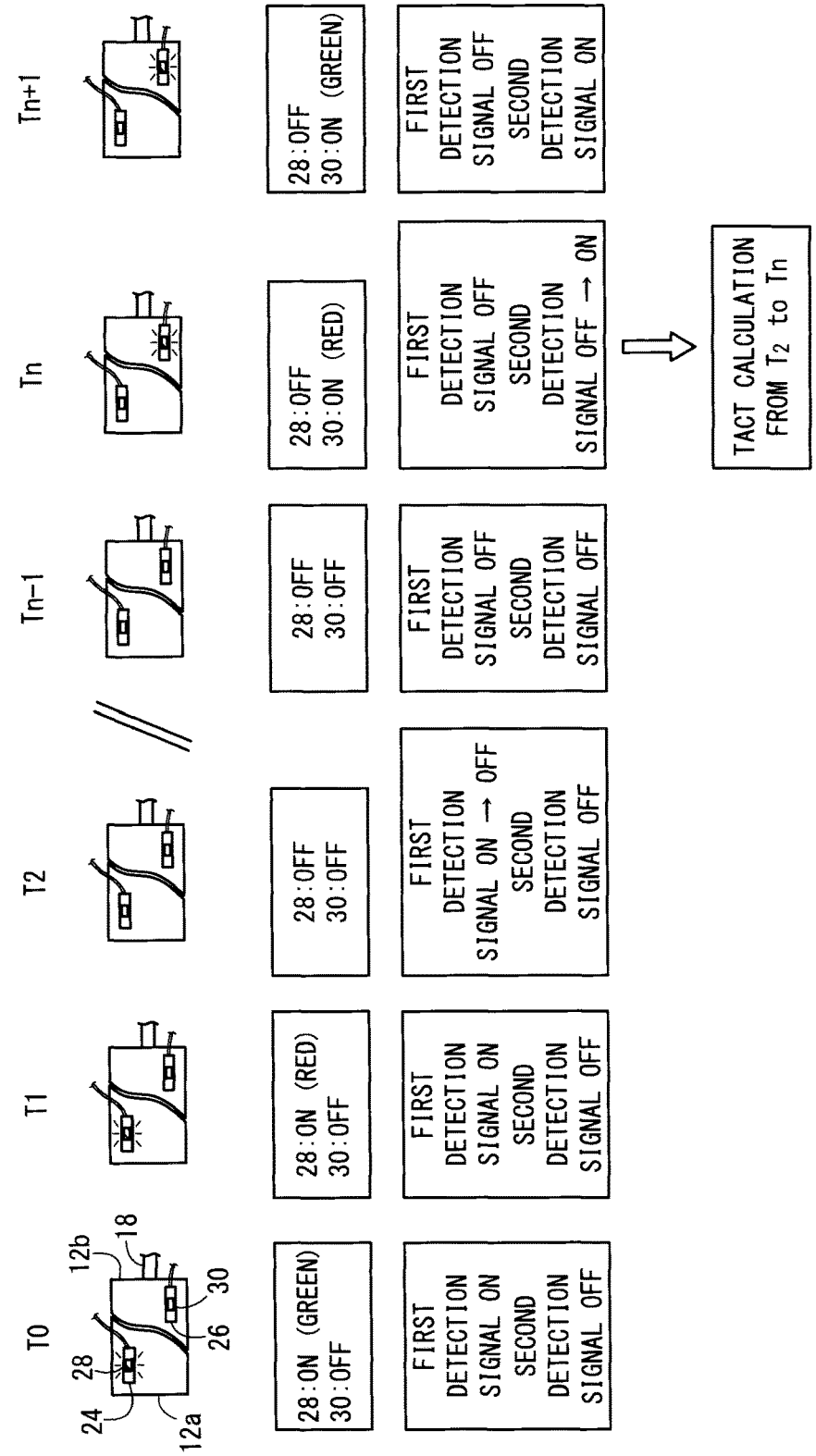
FIG. 6 is a descriptive diagram showing changes in first output signals (light emission signals) of a first sensor and second output signals (light emission signals) of a second sensor, associated with operations of a piston that makes up the actuator driving device, together with on and off states of a first detection signal of the first detecting unit and a second detection signal of the second detecting unit.

FIG. 6 is a descriptive diagram showing changes in the first output signals (light emission signals) of the first sensor 24 and the second output signals (light emission signals) of the second sensor 26, associated with operations of the piston 20 that makes up the actuator driving device 10, together with on and off states of a first detection signal of the first detecting unit 52 and a second detection signal of the second detecting unit 54.

At time T0 in FIG. 6, the piston 20 is positioned at the one end 12a. At this time, since the magnet 22 of the piston 20 is positioned in the center (or in the vicinity of the center) of the magnetic detection region of the first sensor 24, the light emitting body 28 of the first sensor 24 emits green light. The green light is received by the first output signal detecting unit 60, and is transmitted through the first detection signal output unit 62 to the measurement unit 56. The light emitting body 30 of the second sensor 26 does not emit light. Further, at time T0, the first detection signal of the first detecting unit 52 is on, and the second detection signal of the second detecting unit 54 is off.

Starting from time T0, when an excitation signal is transmitted to the solenoid 32 from the control unit 16, the directional switching valve 14 is switched to the valve position 14a, whereupon the pressure fluid is supplied from the fluid pressure source 36 to the one-end-side pressure chamber 12c of the actuator 12, whereas the pressure fluid is discharged from the other-end-side pressure chamber 12d of the actuator 12. Upon doing so, the piston 20 begins to move in a direction from the one end 12a to the other end 12b.

At time T1 in FIG. 6, the piston 20 is positioned in the vicinity of the one end 12a. At this time, since the magnet 22 of the piston 20, although being positioned within the magnetic detection region of the first sensor 24, is nonetheless positioned away from the vicinity of the center, the light emitting body 28 of the first sensor 24 emits red light. The red light is received by the first output signal detecting unit 60, and is transmitted through the first detection signal output unit 62 to the measurement unit 56. The light emitting body 30 of the second sensor 26 does not emit light. Further, at time T1, the first detection signal of the first detecting unit 52 remains on, and the second detection signal of the second detecting unit 54 remains off.

At time T2 of FIG. 6, the piston 20 moves away to a certain degree from the one end 12a. At this time, since the magnet 22 of the piston 20 is positioned outside of the magnetic detection region of the first sensor 24, the light emitting body 28 of the first sensor 24 and the light emitting body 30 of the second sensor 26 do not emit light. In other words, when time T2 comes about, the first output signal (light emission signal) of the first sensor 24 switches from on to off. Upon doing so, the first detection signal of the first detecting unit 52 switches from on to off. The measurement unit 56 regards switching of the first detection signal from on to off as a trigger, and begins to measure the tact.

At time Tn−1 of FIG. 6, although the piston 20 is to some extent in the vicinity of the other end 12b, the piston 20 still is positioned outside of the magnetic detection region of the second sensor 26. Thus, at time Tn−1, both the light emitting body 28 of the first sensor 24 and the light emitting body 30 of the second sensor 26 do not emit light. Further, the first detection signal of the first detecting unit 52 and the second detection signal of the second detecting unit 54 both remain off.

At time Tn in FIG. 6, the piston 20 moves into the vicinity of the other end 12b. At this time, since the magnet 22 of the piston 20, although being positioned within the magnetic detection region of the second sensor 26, is nonetheless positioned away from the vicinity of the center, the light emitting body 30 of the second sensor 26 emits red light. In other words, when time Tn comes about, the second output signal (light emission signal) of the second sensor 26 switches from off to on. The red light is received by the second output signal detecting unit 66, and is transmitted through the second detection signal output unit 68 to the measurement unit 56. Stated otherwise, the second detection signal of the second detecting unit 54 switches from off to on. The measurement unit 56 regards switching of the second detection signal from off to on as a trigger, and terminates the measurement of the tact.

The measurement unit 56 calculates a time interval from the time T2 at which the tact measurement was started until the time Tn at which the tact measurement was stopped, and displays the calculation result as a tact time on the display unit 56a. Further, using the calculated tact time and the movement distance of the piston 20 that was input as a parameter, the measurement unit 56 can calculate an average movement velocity of the piston 20, and can display the calculation result on the display unit 56a.

At time Tn+1 in FIG. 6, the piston 20 arrives at the other end 12b. At this time, since the magnet 22 of the piston 20 is positioned in the center (or in the vicinity of the center) of the magnetic detection region of the second sensor 26, the light emitting body 30 of the second sensor 26 emits green light. The green light is received by the second output signal detecting unit 66, and is transmitted through the second detection signal output unit 68 to the measurement unit 56. The light emitting body 28 of the first sensor 24 does not emit light. Further, at time Tn+1, the first detection signal of the first detecting unit 52 is off, and the second detection signal of the second detecting unit 54 is on.

<Modification 1>

Figure 7:
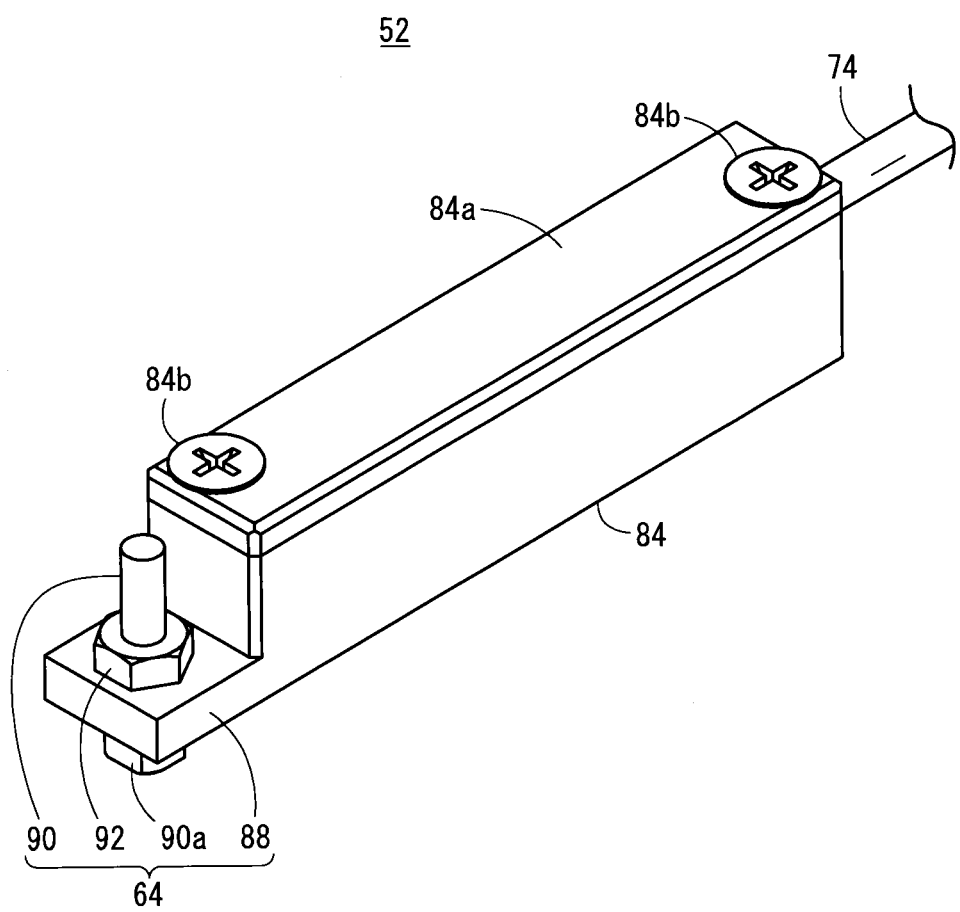
FIG. 7 is a perspective view showing an external appearance of a modification of the first detecting unit shown in FIG. 1.
Figure 9:
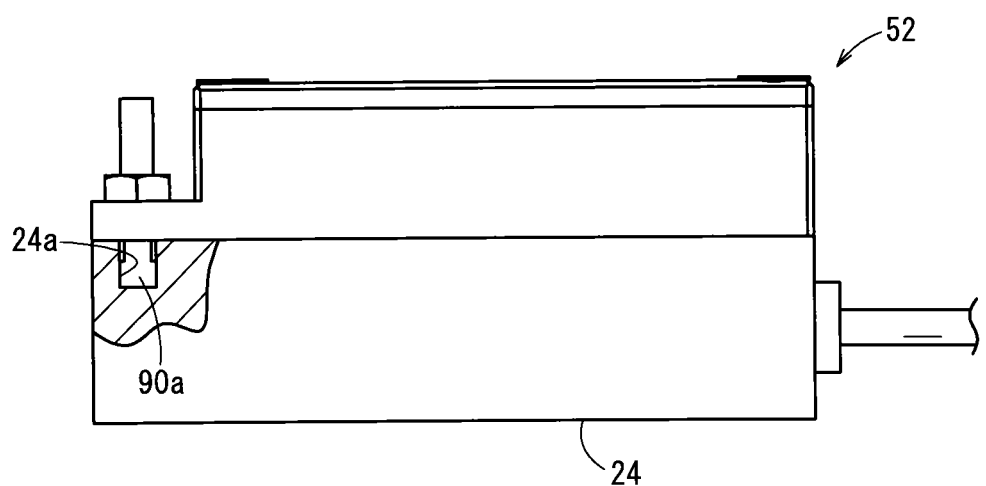
FIG. 9 is a front view showing a configuration in which the first detecting unit shown in FIGS. 8A to 8E is mounted on a first sensor that is used in the actuator driving device.

FIGS. 7 through 9 show a modification of the outer casing 72 shown in FIGS. 3 through 5. FIG. 7 is a perspective view showing the external appearance of the modification of the first detecting unit 52 shown in FIG. 1. FIGS. 8A to 8E are detailed descriptive views of the first detecting unit 52 shown in FIG. 7, in which FIG. 8A is a front view of the first detecting unit 52, FIG. 8B is a plan view of the first detecting unit 52, FIG. 8C is a bottom view of the first detecting unit 52, FIG. 8D is a left side view of the first detecting unit 52, and FIG. 8E is a right side view of the first detecting unit 52. FIG. 9 is a front view showing a configuration in which the first detecting unit 52 shown in FIGS. 8A to 8E is mounted on a first sensor 24 that is used in the actuator driving device 10. In an outer casing 84 to be described below, components thereof that are the same as those of the outer casing 72 are designated with the same reference characters, and detailed description of such features is omitted.

The first detecting unit 52 includes the outer casing 84 that accommodates the circuit shown in FIG. 2 in the interior thereof. On an upper portion of the outer casing 84, a lid 84a is attached thereto by screws 84b.

A lead line 74, which connects the first detection signal output unit 62 and the measurement unit 56 shown in FIG. 1, is drawn out from the right side surface of the outer casing 84. On the other hand, on a left side surface of the outer casing 84, a flange 88, a bolt 90, and a nut 92, which correspond to the first connector 64, are provided. The bolt 90 is screw-inserted into the flange 88 and the nut 92 from the bottom surface side. As shown in FIG. 9, a head portion 90a of the bolt 90 is formed in the shape of a projection, and is fitted into a hole 24a that is formed in the first sensor 24. By means of the first connector 64 that is formed in this manner (the flange 88, the bolt 90, and the nut 92), the first detecting unit 52 can be arranged detachably with respect to the first sensor 24.

Further, the first connector 64 also carries out a role as a marker for indicating an attachment direction of the first detecting unit 52 with respect to the first sensor 24. By the existence of the first connector 64, the attachment direction of the first detecting unit 52 with respect to the first sensor 24 can be grasped.

Further, since the head portion 90a of the bolt 90 of the first connector 64 is fitted into the hole 24a of the first sensor 24, which has been positioned beforehand, when the first detecting unit 52 is mounted on the first sensor 24, the first detecting unit 52 can be attached easily without requiring precise positioning and alignment thereof.

<Modification 2>

Figure 10:
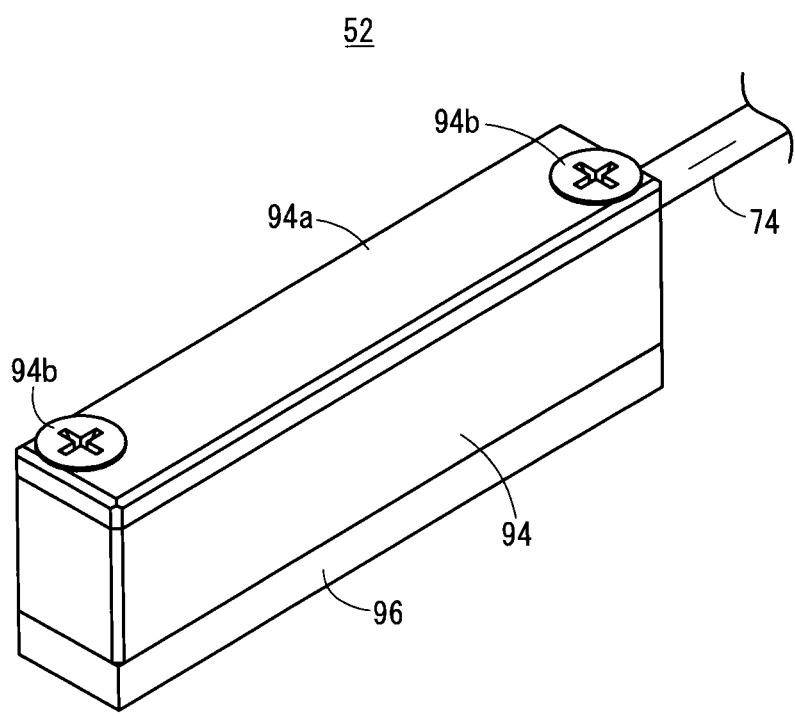
FIG. 10 is a perspective view showing an external appearance of a further modification of the first detecting unit shown in FIG. 1.
Figure 12:
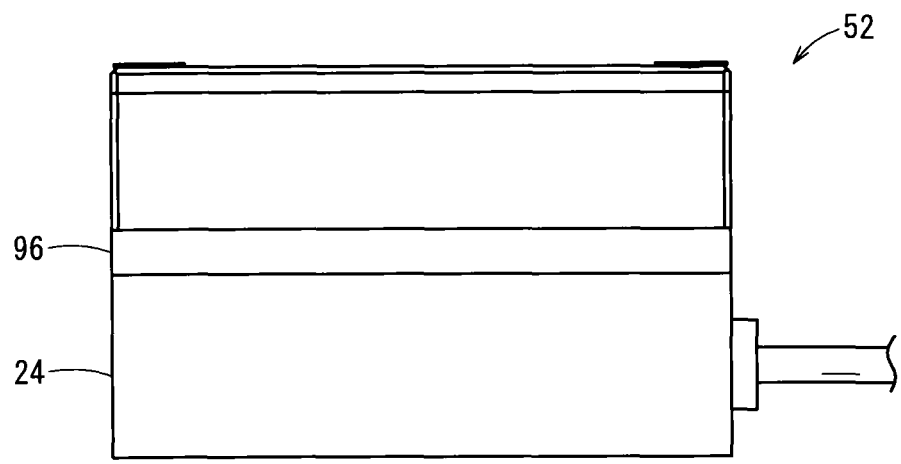
FIG. 12 is a front view showing a configuration in which the first detecting unit shown in FIGS. 11A to 11E is mounted on a first sensor that is used in the actuator driving device.

FIGS. 10 through 12 show a further modification of the outer casing 72 shown in FIGS. 3 through 5. FIG. 10 is a perspective view showing the external appearance of the further modification of the first detecting unit 52 shown in FIG. 1. FIGS. 11A to 11E are detailed descriptive views of the first detecting unit 52 shown in FIG. 10, in which FIG. 11A is a front view of the first detecting unit 52, FIG. 11B is a plan view of the first detecting unit 52, FIG. 11C is a bottom view of the first detecting unit 52, FIG. 11D is a left side view of the first detecting unit 52, and FIG. 11E is a right side view of the first detecting unit 52. FIG. 12 is a front view showing a configuration in which the first detecting unit 52 shown in FIGS. 11A to 11E is mounted on a first sensor 24 that is used in the actuator driving device 10. In an outer casing 94 to be described below, components thereof that are the same as those of the outer casing 72 are designated with the same reference characters, and detailed description of such features is omitted.

The first detecting unit 52 includes the outer casing 94 that accommodates the circuit shown in FIG. 2 in the interior thereof. On an upper portion of the outer casing 94, a lid 94a is attached thereto by screws 94b.

On portions of the bottom surface of the outer casing 94 except for the entrance window 76, an adhesive 96 is provided, which corresponds to the first connector 64. The adhesive 96 is made up from a gel-like glue or sheet material. The adhesive 96 is adhered onto an outer peripheral surface of the first sensor 24 that is provided on the actuator 12. By means of the first connector 64 (the adhesive 96) that is formed in this manner, the first detecting unit 52 can be arranged detachably with respect to the first sensor 24.

Advantages of the First Embodiment

According to the present invention, tact can be measured merely by disposing the detecting unit (the first detecting unit 52 and the second detecting unit 54, i.e., the sensor signal detecting device) with respect to a pre-existing actuator driving device 10 having the first sensor 24 and the second sensor 26 that detect the position of the piston 20 of the actuator 12. Therefore, measurement of tact can easily be performed. Furthermore, in comparison with large-scale equipment, such as a linear displacement sensor or a laser displacement meter, the detecting unit (the first detecting unit 52 and the second detecting unit 54) is simple in structure and conserves space. Moreover, the present invention enables tact to be measured at a low cost.

Further, according to the first embodiment, since output signals (light emission signals), which are output by the pre-existing first sensor 24 and second sensor 26, are detected, and tact is measured by the measurement unit 56 that is provided separately from the control unit 16 of the actuator driving device 10, there is no need for programs for the tact measurement to be added to the control unit 16 such as a PLC. Therefore, it is unnecessary to take preparations for adding programs (understanding the system for each line, preparing programs for each programming language used by the PLC, increasing the capacity of the storage unit for storing such programs, etc.). Accordingly, the burden imposed when tact measurement is carried out is reduced.

Further, the first detecting unit 52 and the second detecting unit 54 can be arranged detachably with respect to the actuator 12. Thus, when the actuator 12 is operated, the first detecting unit 52 and the second detecting unit 54 can be detached from the actuator 12. Therefore, it is possible to prevent the space surrounding the actuator 12 from becoming narrowed.

Second Embodiment

Figure 13:
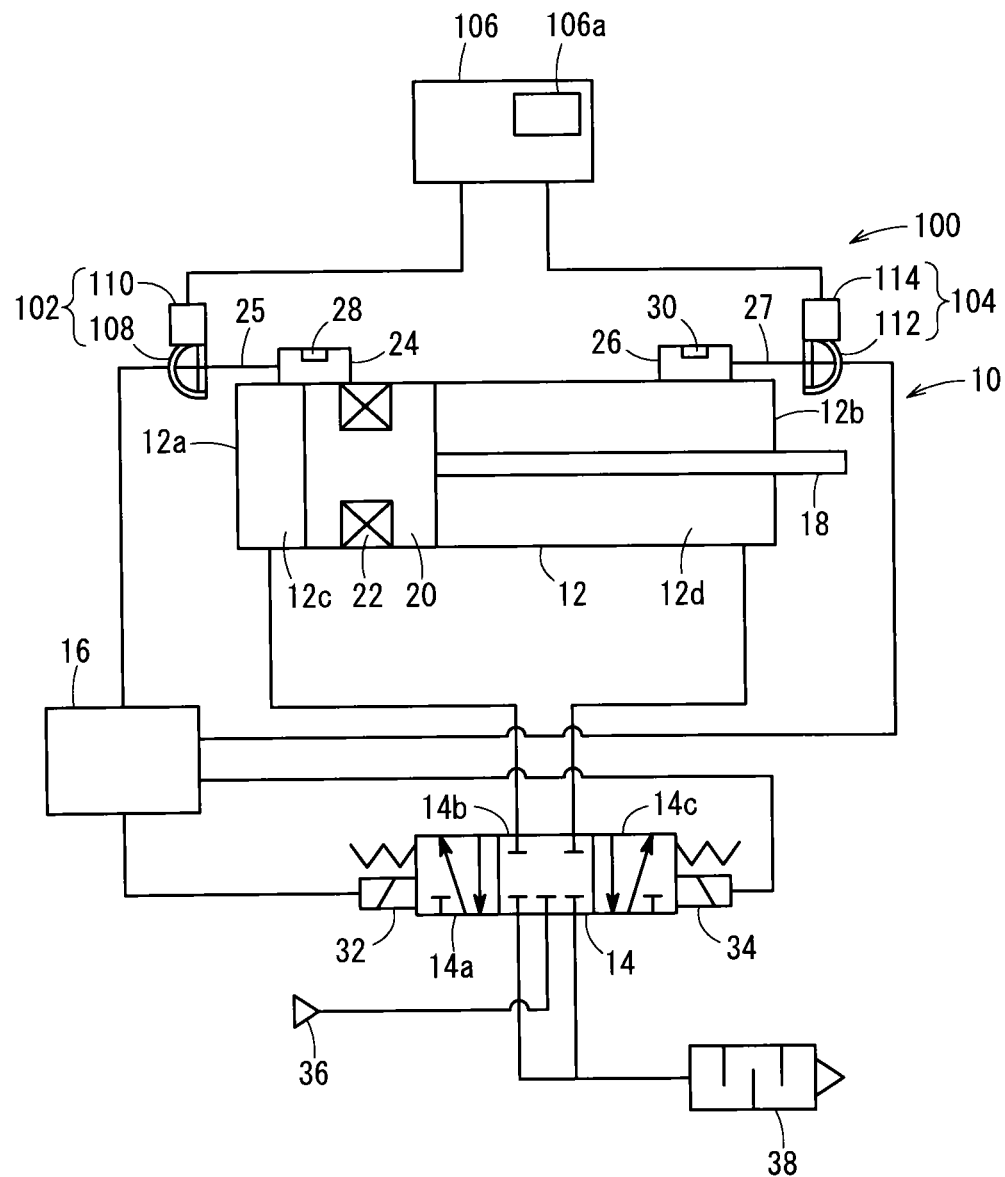
FIG. 13 is a block diagram showing a configuration in which a tact measurement device for an actuator according to a second embodiment of the present invention is disposed on an actuator driving device.
Figure 14A:
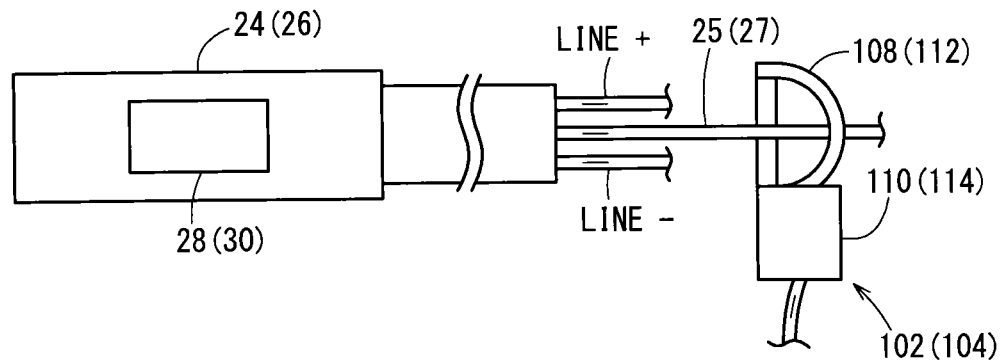
FIG. 14A is an enlarged view showing a configuration in which the first detecting unit shown in FIG. 13 is attached only to a signal line of a first sensor that is used in the actuator driving device.
Figure 14B:
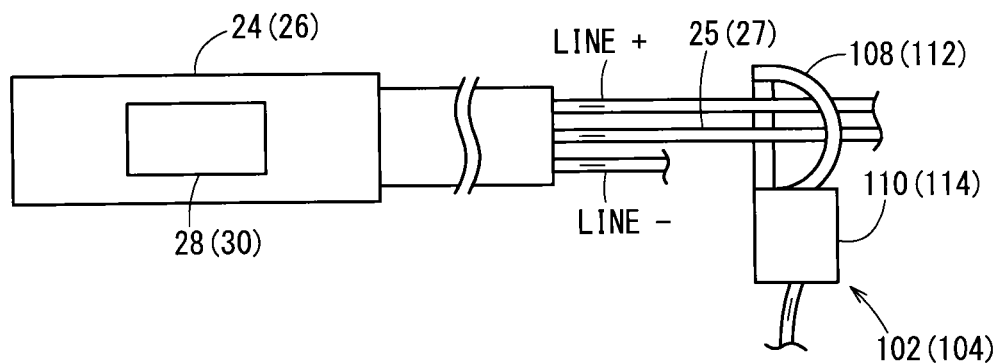
FIG. 14B is an enlarged view showing a configuration in which the first detecting unit shown in FIG. 13 is attached to a signal line and to a positive polarity power source line of the first sensor that is used in the actuator driving device.
Figure 14C:
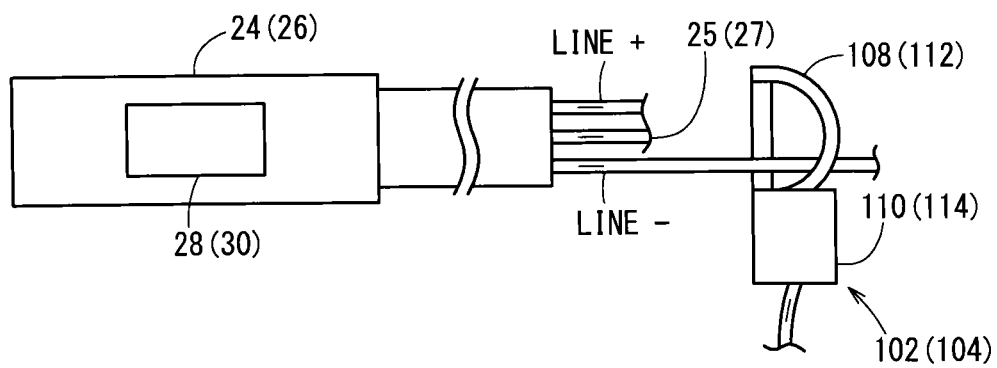
FIG. 14C is an enlarged view showing a configuration in which the first detecting unit shown in FIG. 13 is attached only to a negative polarity power source line of the first sensor that is used in the actuator driving device.

FIG. 13 is a block diagram showing a configuration in which a tact measurement device 100 for an actuator 12 according to a second embodiment is disposed on an actuator driving device 10. FIG. 14A is an enlarged view showing a configuration in which a first detecting unit 102 shown in FIG. 13 is attached only to a signal line 25 of the first sensor 24 that is used in the actuator driving device 10, FIG. 14B is an enlarged view showing a configuration in which the first detecting unit 102 shown in FIG. 13 is attached to the signal line 25 and to a positive polarity power source line of the first sensor 24 that are used in the actuator driving device 10, and FIG. 14C is an enlarged view showing a configuration in which the first detecting unit 102 shown in FIG. 13 is attached only to a negative polarity power source line of the first sensor 24 that is used in the actuator driving device 10.

<Configuration of Tact Measurement Device 100>

As shown in FIG. 13, the tact measurement device 100 for the actuator 12 is equipped with a first detecting unit 102 that is mounted detachably on the signal line 25 that connects the first sensor 24 and the control unit 16, a second detecting unit 104 that is mounted detachably on the signal line 27 that connects the second sensor 26 and the control unit 16, and a measurement unit 106 that monitors the detection signals from the first detecting unit 102 and the second detecting unit 104.

The first detecting unit 102 is a clamp meter. The first detecting unit (clamp meter) 102 comprises a first output signal detecting unit 108 that encloses the signal line 25 (clamping around the signal line 25), detects a first output signal output by the first sensor 24, and outputs a first detection signal, and a first detection signal output unit 110 that outputs to the measurement unit 106 the first detection signal that was output by the first output signal detecting unit 108.

Similarly, the second detecting unit 104 is a clamp meter. The second detecting unit (clamp meter) 104 comprises a second output signal detecting unit 112 that encloses the signal line 27, detects a second output signal output by the second sensor 26, and outputs a second detection signal, and a second detection signal output unit 114 that outputs to the measurement unit 106 the second detection signal that was output by the second output signal detecting unit 112.

When the first detecting unit (clamp meter) 102 is used, as shown in FIG. 14A, only the signal line 25 is enclosed by the first output signal detecting unit 108, whereas the other lines or wirings (i.e., a positive polarity power source line, a negative polarity power source line) are not enclosed thereby. However, as shown in FIGS. 14B and 14C, detections can also be performed by enclosing only the negative polarity power source line, or by enclosing both the signal line 25 and the positive polarity power source line simultaneously. Similarly, when the second detecting unit (clamp meter) 104 is used, as shown in FIG. 14A, only the signal line 27 is enclosed by the second output signal detecting unit 112, whereas the other lines or wirings (i.e., a positive polarity power source line, a negative polarity power source line) are not enclosed thereby. However, as shown in FIGS. 14B and 14C, detections can also be performed by enclosing only the negative polarity power source line, or by enclosing both the signal line 27 and the positive polarity power source line simultaneously.

The measurement unit 106 receives the first detection signal that is output by the first detecting unit 102 and the second detection signal that is output by the second detecting unit 104, and based on the first and second detection signals, the measurement unit 106 measures the time taken for the piston 20 of the actuator 12 to move from the one end 12a to the other end 12b of the movement range. More specifically, a time is measured from switching of the first detection signal from on to off, to switching of the second detection signal from off to on. Of course, the time taken for the piston 20 to move from the other end 12b to the one end 12a of the movement range can also be measured. The measurement unit 106 displays the measured time on a display unit 106a. Further, using the calculated tact time and the movement distance of the piston 20 that was input as a parameter, the measurement unit 106 can calculate an average movement velocity of the piston 20, and can display the calculation result on the display unit 106a.

Below, using FIG. 15, descriptions will be given of the internal structure of the first detecting unit 102. Since the internal structures of the first detecting unit 102 and the second detecting unit 104 are the same, detailed description of the internal structure of the second detecting unit 104 is omitted.

Figure 15:
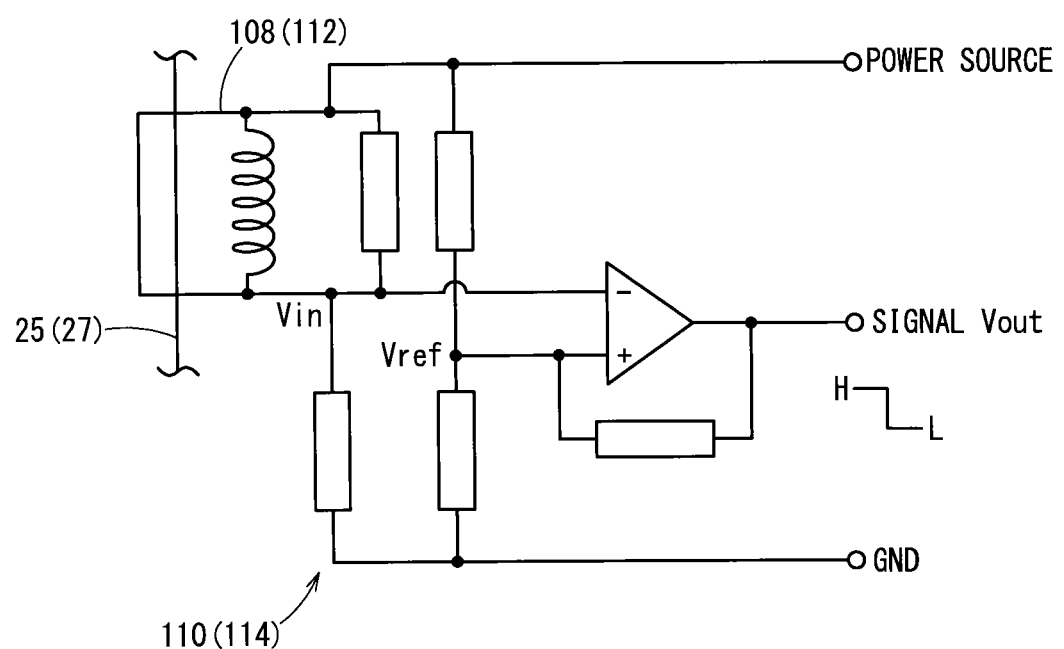
FIG. 15 is a circuit diagram showing an internal structure of the first detecting unit shown in FIG. 13.

FIG. 15 is a circuit diagram showing the internal structure of the first detecting unit 102 shown in FIG. 13, and in particular, shows the first output signal detecting unit 108 and the first detection signal output unit 110. The first output signal detecting unit 108 comprises a clamp that is made up from an iron core and a coil. The first detection signal output unit 110 comprises a comparator circuit that includes the first output signal detecting unit 108. When the first output signal detecting unit 108 detects an output signal that is output to the signal line 25 from the first sensor 24, an input voltage Vin of the comparator circuit rises, and at a point in time that the input voltage Vin exceeds a reference voltage Vref, an output voltage Vout is switched. In the case of the circuit shown in FIG. 15, when the clamp detects the output signal that flows through the signal line 25, the output voltage Vout switches from High, i.e., off, to Low, i.e., on. The output voltage Vout is output as a detection signal to the measurement unit 106.

The process flow of the tact measurement process is substantially the same as in the first embodiment.

The second embodiment achieves the same advantageous effects as those of the first embodiment. More specifically, advantages are obtained in that measurement of tact is easily carried out, and the load incurred when measurement of tact is carried out is reduced. Further, the device is simple in structure and conserves space, tact measurement can be realized at a low cost, and operations of the actuator 12 are not hindered.

Third Embodiment

Figure 16:
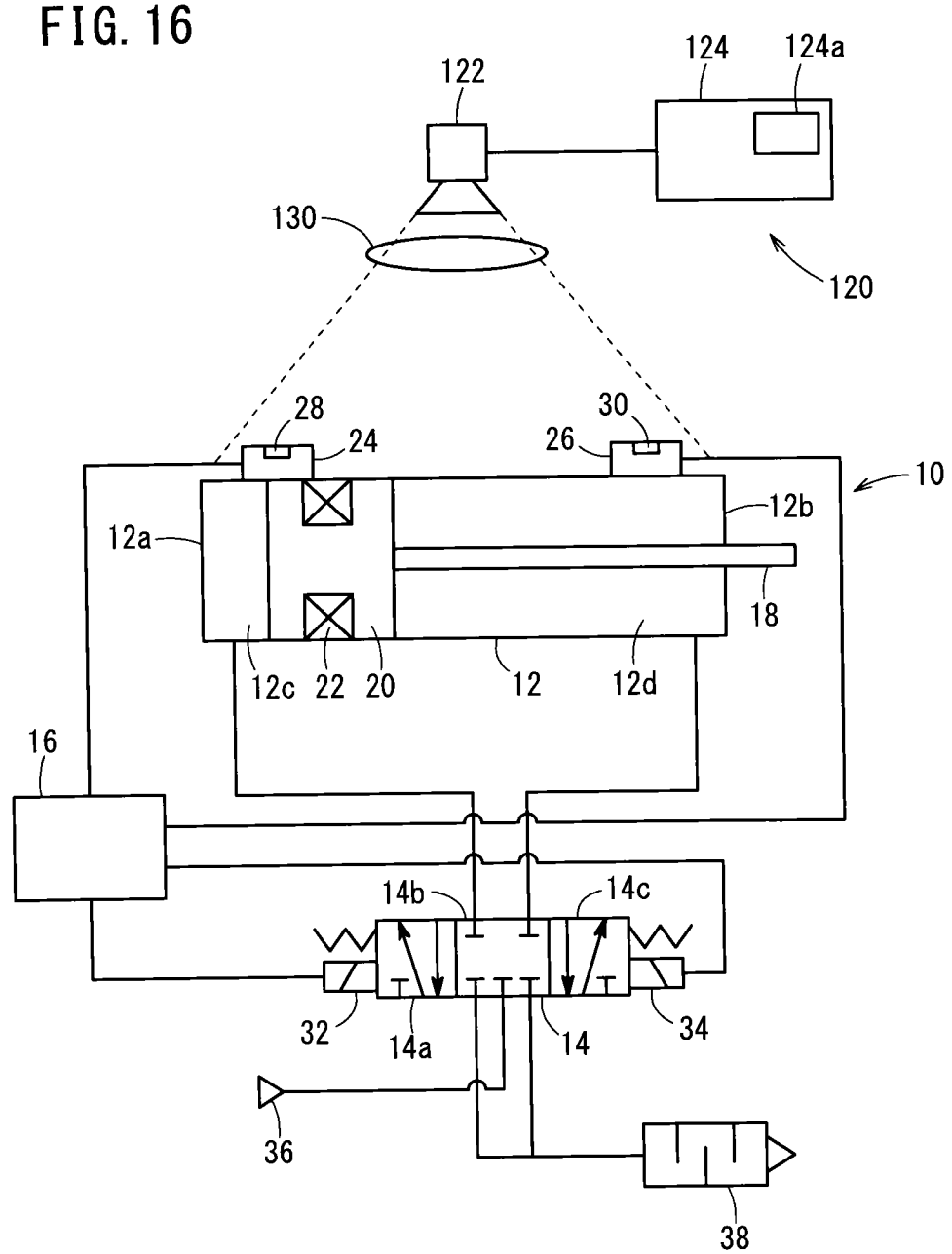
FIG. 16 is a block diagram showing a configuration in which a tact measurement device for an actuator according to a third embodiment of the present invention is disposed on an actuator driving device.

FIG. 16 is a block diagram showing a configuration in which a tact measurement device 120 for an actuator 12 according to a third embodiment is disposed on an actuator driving device 10.

<Configuration of Tact Measurement Device 120>

As shown in FIG. 16, the tact measurement device 120 for an actuator 12 is equipped with a detecting unit 122 that is mounted in the vicinity of the actuator 12, and a measurement unit 124 that monitors the detection signals from the detecting unit 122.

The detecting unit 122 is constituted from a camera equipped with an image sensor such as a CCD or a CMOS, etc., which captures an image of the first sensor 24 and the second sensor 26 that are disposed on the actuator 12. The detecting unit 122 captures first output signals (light emission signals) output by the light emitting body 28 of the first sensor 24 and second output signals (light emission signals) output by the light emitting body 30 of the second sensor 26, and outputs detection signals (image signals).

The measurement unit 124 receives the detection signals (image signals) that are output by the detecting unit 122, and based on the detection signals (image signals), the measurement unit 124 measures the time taken for the piston 20 of the actuator 12 to move from the one end 12a to the other end 12b of the movement range. More specifically, a time is measured from switching of the light emission signal output by the light emitting body 28 of the first sensor 24 from on to off, to switching of the light emission signal output by the light emitting body 30 of the second sensor 26 from off to on. Of course, the time taken for the piston 20 to move from the other end 12b to the one end 12a of the movement range can also be measured. The measurement unit 124 displays the measured time on a display unit 124a. Further, using the calculated tact time and the movement distance of the piston 20 that was input as a parameter, the measurement unit 124 can calculate an average movement velocity of the piston 20, and can display the calculation result on the display unit 124a.

An image processing device can be used as the measurement unit 124. In this case, in the image processing device, there are installed software that generates an image based on the image signals output from the detecting unit 122, software for recognizing from within the generated image the light emitting body 28 of the first sensor 24 and the light emitting body 30 of the second sensor 26, and software for discerning a change in the light emission signal that is output by the light emitting body 28 and a change in the light emission signal that is output by the light emitting body 30.

<Process Flow of Tact Measurement by Image Processing>

The process flow of the tact measurement process is substantially the same as in the first embodiment. However, according to the third embodiment, image processing is performed beforehand prior to the tact measurement.

Figure 17:
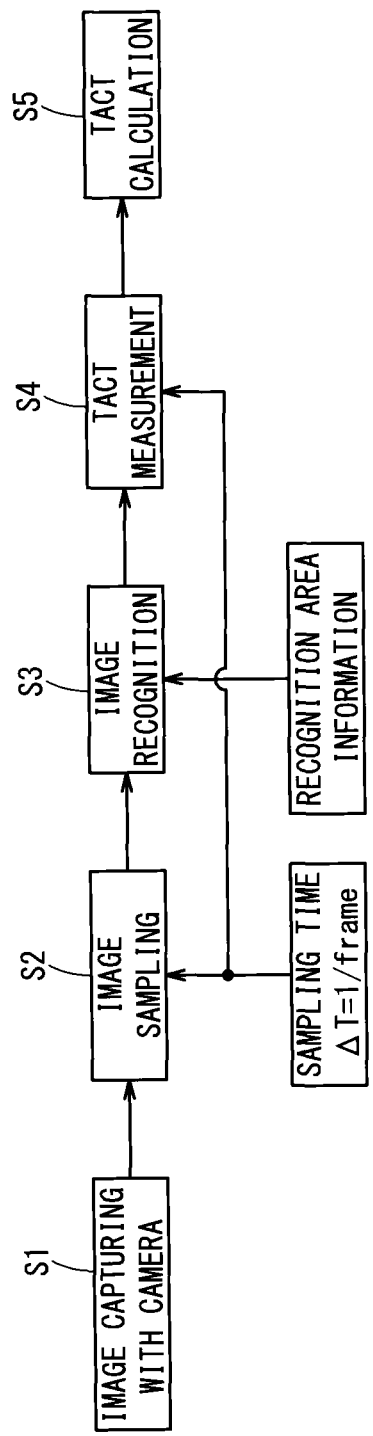
FIG. 17 is a block diagram showing a process flow of a tact measurement process by use of image processing, which is divided into blocks representing steps of the process.

FIG. 17 is a block diagram showing a process flow of a tact measurement process by use of image processing, which is divided into blocks representing steps of the process. Steps S1 through S3 represent image processing steps that are performed beforehand prior to the tact measurement, and step S4 is a process for measuring tact.

Figure 18:
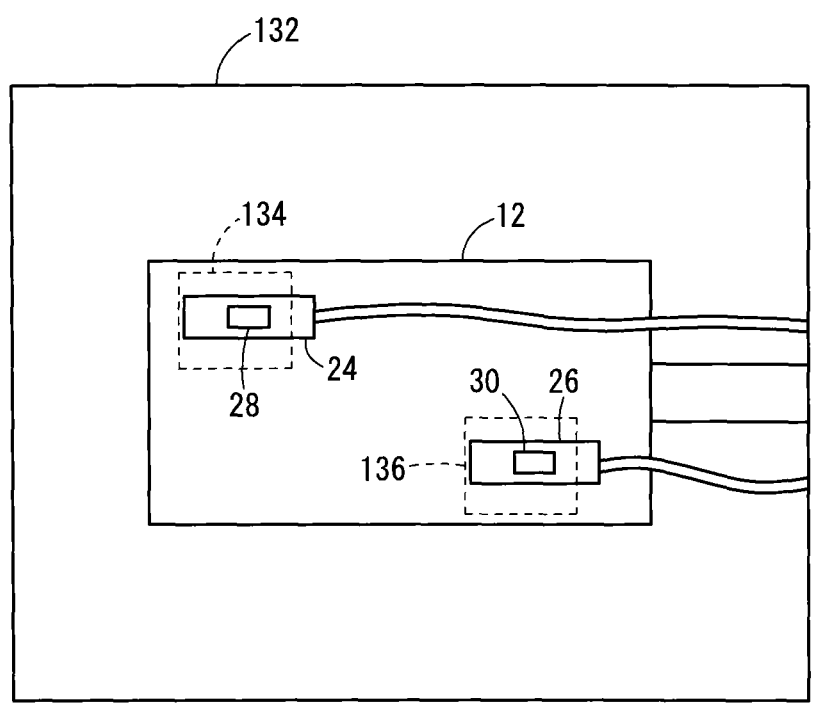
FIG. 18 is a view showing a sampling image.

In step S1, an image area 130 including the first sensor 24 and the second sensor 26 is captured by the detecting unit (camera) 122. An image signal that is generated by the detecting unit (camera) 122 is transmitted to the measurement unit (image processing device) 124. In step S2, within the measurement unit (image processing device) 124, sampling is carried out at a predetermined sampling time ΔT (=1/frame) that is set beforehand based on the image signals, and images 132 of the sampling time ΔT are generated as shown in FIG. 18. In step S3, a generated image 132 is displayed on the display unit 124a of the measurement unit (image processing device) 124. At this time, recognition area information is input, and an area including the light emitting body 28 of the first sensor 24 within the image 132 is designated as a recognition area 134, while an area including the light emitting body 30 of the second sensor 26 within the image 132 is designated as a recognition area 136. Capturing of an image area 130 by the detecting unit (camera) 122, and generation of images 132 of the sampling time ΔT also are performed in the following step S4.

In the next step S4, measurement of tact is carried out. When the piston 20 begins to move from the one end 12a and then the magnet 22 is moved from within the magnetic detection region to outside of the magnetic detection region of the first sensor 24, the light emitting body 28 of the first sensor 24 changes from a light emitting state to a state of not emitting light. Such a condition occurs at time T2 shown in FIG. 6. The measurement unit 124 discerns that the light emitting body 28 of the first sensor 24, which lies within the recognition area 134, has changed from a light emitting state to a non-light emitting state, and such a change serves as a trigger for starting the tact measurement.

As the piston 20 approaches the other end 12b and when the magnet 22 is moved from outside of the magnetic detection region to being within the magnetic detection region of the second sensor 26, the light emitting body 30 of the second sensor 26 changes from a non-light emitting state to a light emitting state. Such a condition occurs at time Tn shown in FIG. 6. The measurement unit 124 discerns that the light emitting body 30 of the second sensor 26, which lies within the recognition area 136, has changed from a non-light emitting state to a light emitting state, and such a change serves as a trigger for stopping the tact measurement.

In addition, in step S5, the measurement unit 124 calculates a time interval from the time T2 at which the tact measurement was started until the time Tn at which the tact measurement was stopped, and displays the calculation result as a tact time on the display unit 124a. Further, using the calculated tact time and the movement distance of the piston 20 that was input as a parameter, the measurement unit 124 can calculate an average movement velocity of the piston 20, and can display the calculation result on the display unit 124a.

The third embodiment achieves the same advantageous effects as those of the first embodiment. More specifically, advantages can be obtained, for example, in that the load incurred when measurement of tact is carried out can be reduced.

The present invention is not limited to the embodiments described above. It goes without saying that various alternative or additional structures could be adopted therein without departing from the essential scope of the invention as set forth in the appended claims.

What is claimed is:

1. A tact measurement device for an actuator, which measures a tact time taken for a movable member of the actuator to move from one end to another end of a movement range, comprising:
    a first sensor disposed on the actuator and including a first light emitting body to output a first light emission signal;
    a second sensor disposed on the actuator and including a second light emitting body to output a second light emission signal;
    a detector that comprises a first detector and a second detector, the first detector detecting a first output signal that is defined by the first light emission signal and is output responsive to detecting, by the first sensor, that the movable member is positioned at the one end of the movement range, and outputs a first detection signal, and the second detector detecting a second output signal that is defined by the second light emission signal and is output responsive to detecting, by the second sensor, that the movable member is positioned at the other end of the movement range, and outputs a second detection signal; and
    a measurer that measures the tact time taken for the movable member to move from the one end to the other end of the movement range, based on the first detection signal and the second detection signal,
    wherein the first detector comprises a first output signal detector that detects the first output signal and outputs the first detection signal, and the second detector comprises a second output signal detecting unit that detects the second output signal and outputs the second detection signal.

2. The tact measurement device for an actuator according to claim 1,
    the first detector comprising:
        a first detection signal outputter that outputs to the measurer the first detection signal that was output by the first output signal detector; and
    the second detector comprising:
        a second detection signal outputter that outputs to the measurer the second detection signal that was output by the second output signal detector.

3. The tact measurement device for an actuator according to claim 2, wherein:

the first detector comprises a first connector configured to detachably mount the first output signal detector to the first sensor that is disposed on the actuator; and the second detector comprises a second connector configured to detachably mount the second output signal detector to the second sensor that is disposed on the actuator.

4. The tact measurement device for an actuator according to claim 2, wherein:

the first detector comprises a marker that indicates an attachment direction with respect to the first sensor disposed on the actuator; and the second detector comprises a marker that indicates an attachment direction with respect to the second sensor disposed on the actuator.

5. The tact measurement device for an actuator according to claim 3, wherein:

the first connector comprises a first gripping member that grips the first sensor disposed on the actuator; and the second connector comprises a second gripping member that grips the second sensor disposed on the actuator.

6. The tact measurement device for an actuator according to claim 3, wherein:

the first connector comprises a first projection that is fitted into the first sensor disposed on the actuator; and the second connector comprises a second projection that is fitted into the second sensor disposed on the actuator.

7. The tact measurement device for an actuator according to claim 3, wherein:

the first connector comprises a first adhesive that is adhered to the first sensor disposed on the actuator; and the second connector comprises a second adhesive that is adhered to the second sensor disposed on the actuator.

8. A sensor signal detecting device comprising:

an output signal detector that encloses a signal line connected to a sensor, detects a signal output by the sensor including a light emitting body to output a light emission signal;

a detection signal detector that externally outputs the light emission signal that was output by the output signal detector; and a connector configured to detachably mount the output signal detector to the sensor.

9. The sensor signal detecting device according to claim 8, further comprising a marker that indicates an attachment direction with respect to the sensor.

10. The sensor signal detecting device according to claim 8, wherein the connector comprises a gripping member that grips the sensor.

11. The sensor signal detecting device according to claim 8, wherein the connector comprises a projection that is fitted into the sensor.

12. The sensor signal detecting device according to claim 8, wherein the connector comprises an adhesive that is adhered to the sensor.

13. A tact measurement device for an actuator, which measures a tact time taken for a movable member of the actuator to move from one end to another end of a movement range, the actuator including a first sensor that detects that the movable member is positioned at the one end of the movement range, and outputs a first output signal defined as a first light emission signal, and a second sensor that detects that the movable member is positioned at the other end of the movement range, and outputs a second output signal defined as a second light emission signal, the tact measurement device comprising:

a detector that detects the first output signal and outputs a first detection signal, and that further detects the second output signal and outputs a second detection signal; and a measurer that measures the tact time taken for the movable member to move from the one end to the other end of the movement range, based on the first detection signal and the second detection signal.

14. The tact measurement device for an actuator according to claim 13, wherein the detector comprises a first detector and a second detector, the first detector comprising:

a first output signal detector that detects the first output signal and outputs the first signal detection signal; and a first detection signal outputter that outputs to the measurer the first detection signal that was output by the first output signal detector; and the second detector comprising:

a second output signal detector that detects the second output signal and outputs the second signal detection signal; and a second detection signal outputter that outputs to the measurer the second detection signal that was output by the second output signal detector.

15. The tact measurement device for an actuator according to claim 14, wherein:

the first detector comprises a first connector configured to detachably mount the first output signal detector to the first sensor that is disposed on the actuator; and the second detector comprises a second connector configured to detachably mount the second output signal detector to the second sensor that is disposed on the actuator.

16. The tact measurement device for an actuator according to claim 14, wherein:

the first detector comprises a marker that indicates an attachment direction with respect to the first sensor disposed on the actuator; and the second detector comprises a marker that indicates an attachment direction with respect to the second sensor disposed on the actuator.

17. The tact measurement device for an actuator according to claim 15, wherein:

the first connector comprises a first gripping member that grips the first sensor disposed on the actuator; and the second connector comprises a second gripping member that grips the second sensor disposed on the actuator.

18. The tact measurement device for an actuator according to claim 15, wherein:

the first connector comprises a first projection that is fitted into the first sensor disposed on the actuator; and the second connector comprises a second projection that is fitted into the second sensor disposed on the actuator.

19. The tact measurement device for an actuator according to claim 15, wherein:

the first connector comprises a first adhesive that is adhered to the first sensor disposed on the actuator; and the second connector comprises a second adhesive that is adhered to the second sensor disposed on the actuator.

\* \* \* \* \*